United States Patent [19]

Hardy, Jr.

[11] Patent Number: 4,944,551

[45] Date of Patent: Jul. 31, 1990

[54] OPEN TOP DUMP TRAILER TARPING SYSTEM

[75] Inventor: Harold Hardy, Jr., Canton, Mich.

[73] Assignee: Rock-Way, Inc., Romulus, Mich.

[21] Appl. No.: 358,078

[22] Filed: May 30, 1989

[51] Int. Cl.[5] .................... B60P 7/04

[52] U.S. Cl. .................... 296/100; 160/84.1; 160/267.1

[58] Field of Search .................... 296/100, 98, 105; 105/377; 160/84.1, 265–267.1; 125/88

[56] References Cited

U.S. PATENT DOCUMENTS

| | | | |
|---|---|---|---|
| 1,263,759 | 4/1918 | Hanaway | 296/105 |
| 2,068,041 | 1/1937 | Tate, Sr. | 296/105 |
| 2,469,958 | 5/1949 | Fowler | 296/105 |
| 2,559,310 | 7/1951 | McNavage | 296/105 |
| 2,610,086 | 9/1952 | Shield | 296/105 |
| 2,670,988 | 3/1954 | Cook | 296/105 |
| 2,824,764 | 2/1958 | Stirling | 296/105 |
| 3,202,454 | 8/1965 | Neidlinger | 296/100 |
| 3,481,645 | 12/1969 | Stepp | 296/105 |
| 3,806,185 | 4/1974 | Brandjord | 296/98 |
| 4,067,603 | 1/1978 | Fenton | 296/100 |
| 4,285,539 | 8/1981 | Cole | 296/105 |
| 4,801,171 | 1/1989 | Weaver | 296/100 |

FOREIGN PATENT DOCUMENTS

| | | | |
|---|---|---|---|
| 0939418 | 1/1974 | Canada | 296/105 |
| 0995714 | 8/1976 | Canada | 296/105 |
| 693979 | 7/1953 | United Kingdom | 296/98 |

OTHER PUBLICATIONS

Cramaro advertisement, date unknown.
Aero Industries, Inc., Advertisement, data unknown.
8000 GLX and 8800 GLX Ground Level/Safeguard Mechanism, date unknown.
Pioneer advertisement, Pioneer Cover-All TM, Jan. 1989, Michigan Truck Trader, pp. 5–42.

*Primary Examiner*—Dennis H. Pedder
*Attorney, Agent, or Firm*—Barnes, Kisselle, Raisch, Choate, Whittemore & Hulbert

[57] ABSTRACT

A tarping system for an open top dump trailer, comprising a tarp supported on cables extending along the tops of the side walls of the trailer. The front end of the tarp is affixed to the trailer body. The side edges of the tarp have attaching elements which slidably engage the cables. A transverse draw bar is secured to the free end portion of the tarp and has tubular end portions which slidably receive the cables. Wires secured to the draw bar extend along the margins of a terminal flap of the tarp at the free end and are connected to a line for pulling the tarp to an extended or retracted position.

3 Claims, 3 Drawing Sheets

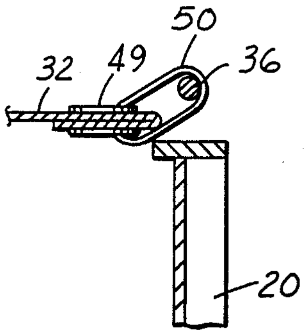
FIG. 6
FIG. 7
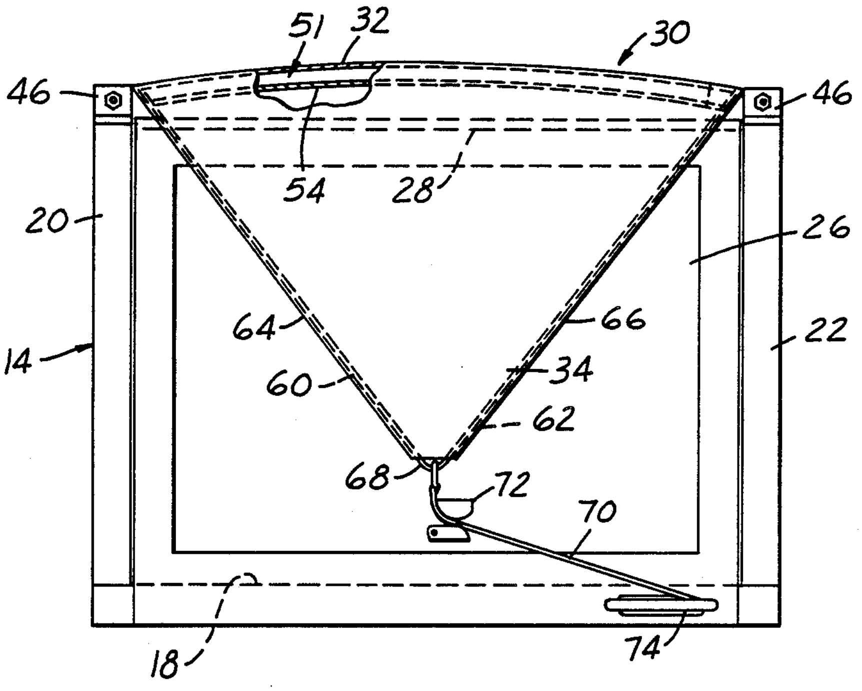
FIG. 9
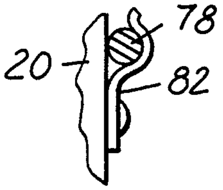
FIG. 8
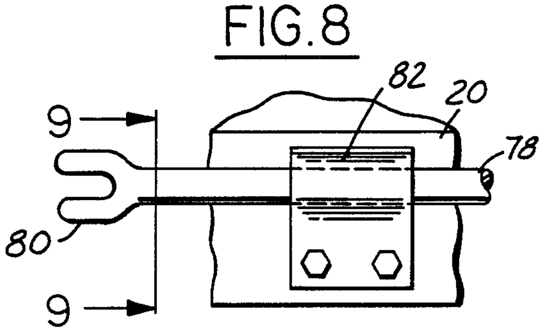

OPEN TOP DUMP TRAILER TARPING SYSTEM

This invention relates generally to a tarping system and refers more particularly to a tarping system for an open top dump trailer.

BACKGROUND AND SUMMARY OF THE INVENTION

Tarping systems presently in use have two principle drawbacks. They are either too expensive or they take too much time to operate. The tarping system of this invention has been designed so that it can be produced at minimum cost and yet can be operated quickly and easily by one person.

In accordance with a specific embodiment of this invention, the tarping system comprises a flexible tarp supported on a pair of linear members (cables) extending along the tops of the two side walls of the vehicle body. The side edges of the tarp are provided at longitudinally spaced points with attaching elements which slidably engage the cables. One end of the tarp is fixed to one end wall of the vehicle body, preferably the front end. The tarp may be manually pulled along the cables rearwardly to an extended position covering the open top of the vehicle body. The tarp may be moved forwardly along the cables to the front end of the vehicle body where it will fold and bunch up in a retracted position. Provision is made for securing the tarp in both its extended and retracted positions.

More specifically, the tarping system includes a transverse draw bar secured to the tarp adjacent its free end. This draw bar has tubes which slidably receive the linear members or cables. The tubes are long enough to permit the draw bar to move without binding. The free end portion of the tarp in the configuration shown is triangular, in the form of a terminal flap. Flexible wires secured to the ends of the draw bar extend along the margins of the terminal flap to the tip end of the flap where they are connected together and are adapted to be engaged by means for securing the tarp in its extended and retracted positions.

It is a general object of this invention to provide a tarping system which is superior to those presently in use, which is relatively inexpensive to manufacture and relatively easy to operate, and which has the features referred to hereinabove.

These and other objects of the invention will become more apparent as the following description proceeds especially when considered with the accompanying drawings.

BRIEF DESCRIPTION OF THE DRAWINGS

FIG. 6 is a fragmentary sectional view taken on the line 6—6 in FIG. 3.

FIG. 7 is a rear end view of the dump trailer body, showing the terminal flap of the tarp secured.

FIG. 8 is a fragmentary detail of an instrument used in moving the tarp from retracted to extended position, shown mounted on the side of the dump trailer body.

FIG. 9 is a sectional view taken on the line 9—9 in FIG. 8.

DETAILED DESCRIPTION

Figure 1:
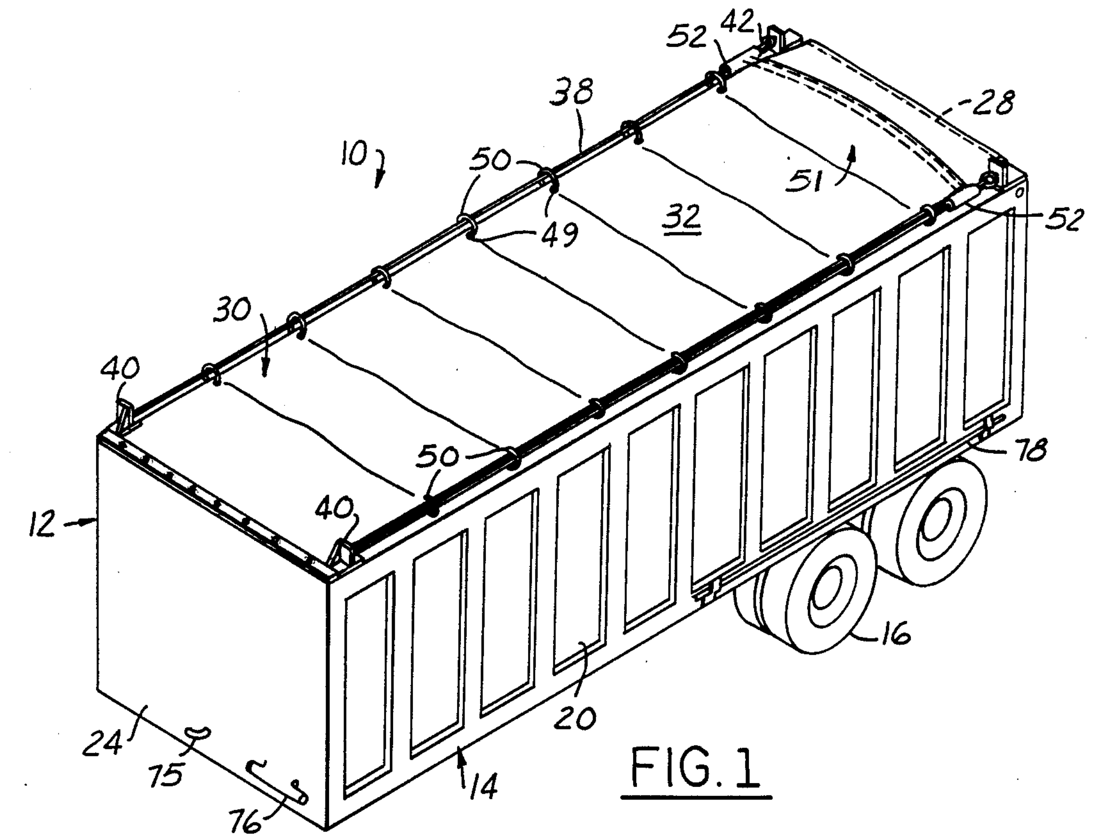
FIG. 1 is a perspective view of a dump trailer having the tarping system of this invention associated therewith, the tarp being shown in its extended position covering the open top of the dump trailer.

Referring now more particularly to the drawings, the numeral 10 designates a tarping system for an open top truck or trailer vehicle 12. In this instance, the vehicle 12 is a dump trailer.

The dump trailer 12 has a trailer body 14 on wheels 16. The trailer body has a bottom wall 18, laterally spaced, parallel side walls 20 and 22 extending vertically upwardly from the sides of the bottom wall 18, and longitudinally spaced, parallel end walls 24 and 26 extending vertically upwardly from the ends of the bottom wall 18. The front ends of the side walls are connected to the sides of the front wall 24. The rear wall is pivoted at the top to a horizontal rod 28 extending between the side walls, so that when the truck body is elevated the rear wall can swing open at the bottom and discharge a load.

The tarping system includes a tarp 30 which is a flexible sheet of fabric or plastic or any other suitable material. The tarp 30 has a rectangular main portion 32 and a rear end portion 34 which is in the form of a terminal flap of triangular shape. The main portion 32 of the tarp has a width and length approximating the corresponding dimensions of the open top of the trailer body defined by the upper edges of the side and end walls 22–26.

Linear members in the form of cables 36 and 38 extend along the tops of the side walls. The front end of each cable is secured to a bracket 40 which is fixed in position by welding or by any suitable means to the top of a side wall near the front of the trailer body. The rear end of each cable is secured to an eye-bolt 42 which extends through an opening 44 in a bracket 46 secured to the top of a side wall near the rear end of the trailer body. This eye-bolt 42 is threaded, and a nut 48 threaded on the end of the eye-bolt makes it possible to draw the cable tight and to further tighten the cable in the event that it should become slack after a long period of use.

Figure 2:
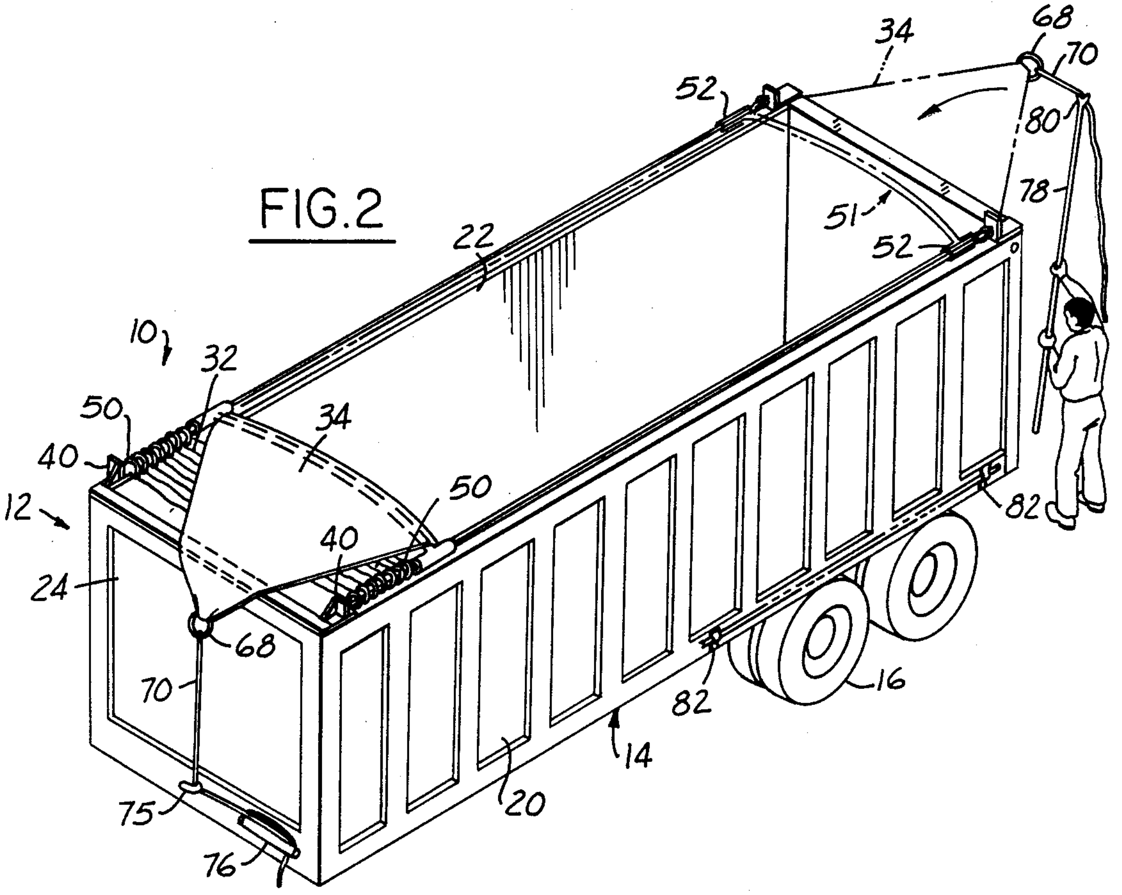
FIG. 2 is similar to FIG. 1 but shows the tarp in retracted position.
Figure 3:
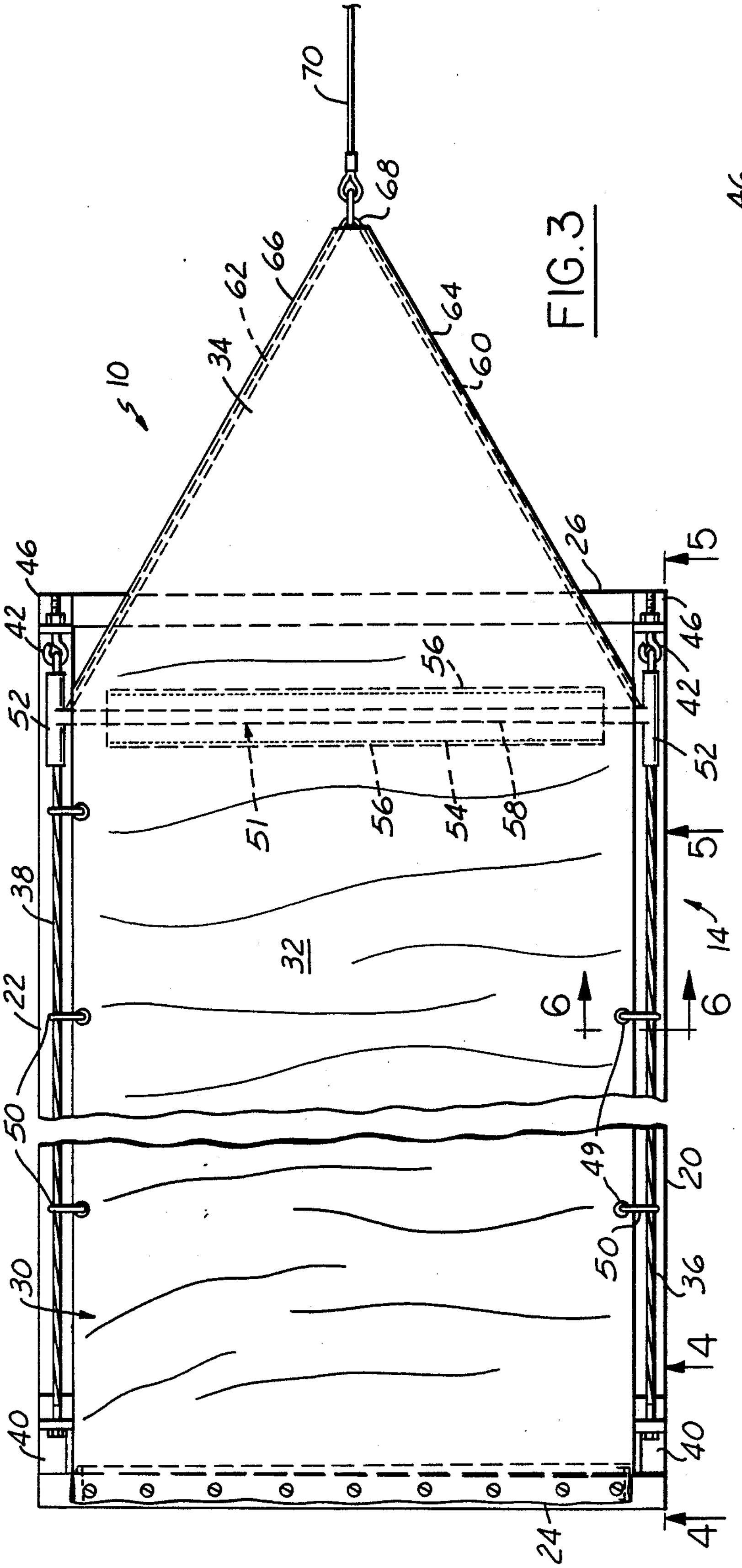
FIG. 3 is a top plan view of the structure of FIG. 1, in which the tarp is in its extended position but the terminal flap has not been secured.
Figure 5:
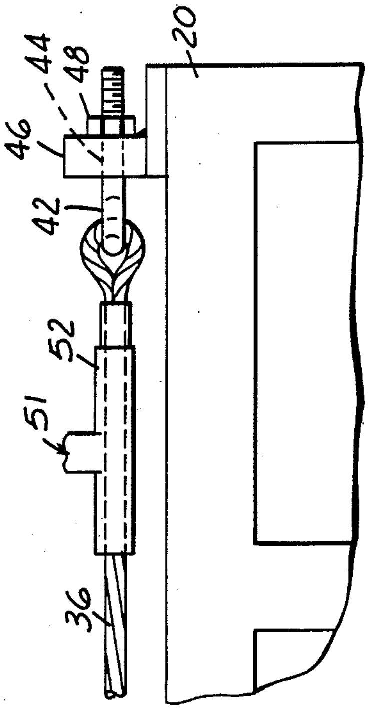
FIG. 5 is a fragmentary view taken on the line 5—5 in FIG. 3.
Figure 4:
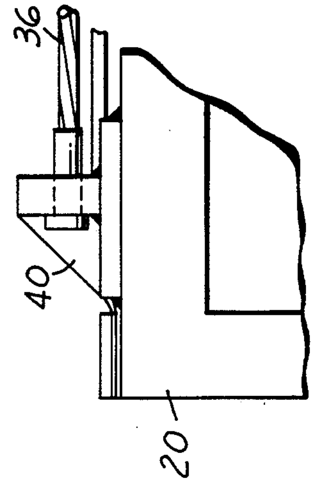
FIG. 4 is a fragmentary view taken on the line 4—4 in FIG. 3.

Along each side edge of the main portion 32 of the tarp are a plurality eyelets 49 which are spaced apart from one another lengthwise of the tarp. Rings 50 extend through these respective eyelets and also encircle the cables. These rings loosely surround the cables so that they may slide along the cables when the tarp is moved from the extended position of FIG. 1 to the retracted position of FIG. 2.

The tarping system includes a transverse draw bar 51 which extends across the open top of the trailer body and has tubes 52 at the ends which extend at right angles to the draw bar. The tubes 52 slidably receive the respective cables 36 and 38, and are of a length sufficient to enable the draw bar to slide along the cables in forward and rearward directions without binding.

At about the juncture between the main rectangular portion 32 and the triangular flap 34 of the tarp, is an elongated strip 54 of tarp material which extends crosswise of the tarp and is secured to the tarp as by two rows of stitching 56 to provide an open ended tunnel or passage 58 through which the draw bar extends. It will be noted that the draw bar is upwardly arched slightly so as to more readily clear the load in the dump trailer body.

One end of a flexible wire 60 is secured to the draw bar 51 near one end thereof. One end of a flexible wire 62 is secured to the draw bar 51 near the other end thereof. These wires 60 and 62 extend in seams along the converging edges 64 and 66 of the flap 34 and beyond the tip end of the flap are integrally joined together in a partial loop or connector 68. A line 70, which may be a rope or cable, is tied to the loop or connector 68.

To secure the tarp in extended position in which the main portion 32 substantially fully covers the open top, the line 70 is pulled through a cleat 72 and wrapped up on a retainer 74 on the rear wall 26 (see FIG. 7). To secure the tarp 30 in retracted position, the line is passed through a hook 75 and wrapped on a retainer 76 (see FIG. 2).

A pole 78 may be used to assist in moving the tarp 30 between extended and retracted position. The pole 78 has a notch 80 on one end. When not in use, the pole 78 may be stored on the side of the trailer body where it is held by clips 82 on one of the side walls.

To move the tarp 30 from extended to retracted position, the line 70 is released from the cleat 72 and retainer 74 and then placed in the notch 80 of pole 78. A person standing on the ground may then manipulate the line 70 with the pole to clear the upper rear corner of the trailer body. The line 70 may then be grasped by hand to pull the flap 34 toward the front end of the trailer body, during which time wires 60 and 62 pull the draw bar which moves smoothly along the cables 36 and 38 without cocking one way or the other. The tubes on the ends of the draw bar are long enough to prevent binding on the cables. The rings 50 also move smoothly and the tarp will fold and bunch up.

At the front end, the pole may be used to lift the line 70 over the upper front corner of the trailer body, after which the flap 34 is secured by passing the line 70 through the hook 75 and wrapping it on retainer 76. In this retracted position, the flap 34 extends over the folded and bunched up main portion 32 of the tarp. The tarp may be moved from retracted to extended position by reversing the procedure. During movement of the tarp in either direction, the rings 50 move freely along cables 36 and 38 as the tarp folds or unfolds, and the draw bar also moves freely and keeps the two side edges of the tarp folding and unfolding at the same rate, without one side getting ahead of the other.

What is claimed:

1. A tarping system for a truck or trailer vehicle body having laterally spaced side walls, longitudinally spaced end walls and an open top, comprising a linear member secured to and extending along the top of each side wall, a flexible tarp for covering the open top of said vehicle body, said tarp having side edge portions provided at longitudinally spaced points with attaching means slidably engaging said linear members, said tarp having a fixed end portion secured to one end wall of said vehicle body, said tarp having as free end portion which may be manually drawn toward the opposite end wall of said vehicle body to cause said attaching means to slide along said linear members and said tarp to assume an extended position covering the open top of said vehicle body, said free end portion of said tarp being capable of being manually drawn toward said one end wall of said vehicle body to cause said attaching means to slide along said linear members and said tarp to fold and bunch up adjacent said one end wall of said vehicle body in retracted position, means for securing said tarp in said extended and retracted positions, a transverse draw bar secured to said tarp adjacent the free end portion thereof, means at the ends of said draw bar slidably engaging said linear members, said free end portion of said tarp extending beyond said draw bar and being in the form of a terminal flap, said terminal flap having a tip end remote from said draw bar and having laterally spaced side edges, and flexible wire-like elements secured to said draw bar near the ends thereof, said wire-like elements extending from said draw bar along and secured to said side edges, said wire-like elements extending to said tip end of said terminal flap where said wire-like elements are connected and adapted to be engaged by said means for securing said tarp in extended and retracted positions.

2. A tarping system as defined in claim 1, wherein said means at the ends of said draw bar comprise tubes which slidably receive said linear members, said tubes being of a length sufficient to permit said draw bar to be moved without binding on said linear members.

3. A tarping system as defined in claim 1, wherein said side edges of said terminal flap converge toward said tip end thereof forming said flap in the shape of a triangle.

* * * * *